Oct. 6, 1964 A. W. MARZIANI 3,152,196
STAGE EFFICIENCY IN LIQUID-LIQUID EXTRACTION PROCESS
Filed Dec. 21, 1960
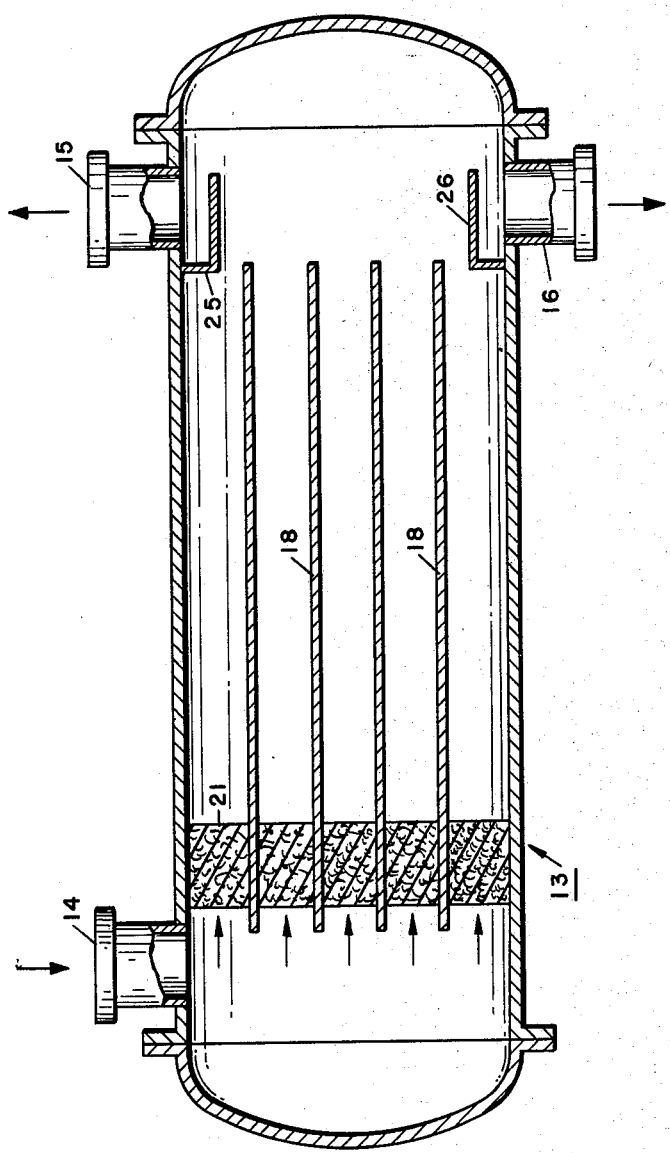
INVENTOR:
ALEXANDER WILLIAM MARZIANI
BY: William D. Hager
HIS ATTORNEY United States Patent Office 3,152,196
Patented Oct. 6, 1964

3,152,196
STAGE EFFICIENCY IN LIQUID-LIQUID
EXTRACTION PROCESS
Alexander William Marziani, Gardena, Calif., assignor to
Shell Oil Company, New York, N.Y., a corporation of
Delaware
Filed Dec. 21, 1960, Ser. No. 77,358
4 Claims. (Cl. 260—681.5)

This invention relates to the liquid-liquid extraction, by an aqueous solution of a suitable water-soluble salt, of low molecular weight unsaturated hydrocarbons reactable with the salt from hydrocarbon mixtures containing them and non-reactable hydrocarbons. More particularly, it relates to an improved method of extracting conjugated diolefins, such as butadiene, and acetylenic hydrocarbons such as methylacetylene, from mixtures with other hydrocarbons such as the corresponding monoolefins and alkanes, with an aqueous solution of a soluble metal salt of a metal such as copper and silver, e.g., cuprous ammonia acetate (ammoniacal cuprous acetate).

It is known that, when using liquid-liquid extraction techniques, the greater the mutual surface area exposed between the contacting liquids, the more complete is the extraction. It is also known that the greater the mutual surface area exposed between the contacting liquids, the smaller must be the particle size of the liquid droplets. Such smaller particle sizes lead to difficulties in separation which are attributed to emulsification and entrainment. In many cases, especially where the difference in gravity between the liquids to be separated is small, emulsification and entrainment are such serious problems that it is often commercially inappropriate to use extractants which are otherwise suitable.

Various proposals have been suggested in connection with this emulsification and entrainment problem. Frequently, the addition of chemical emulsification inhibitors and anti-foam agents to the contacting liquids has been moderately successful, but different compounds are required as the extraction systems differ and the exact material to be used is often discovered only through trial and error methods in order that maximum effectiveness be attained. It is also known that an emulsification inhibitor appropriate under one set of conditions would, under different circumstances, be totally ineffective and might often even promote emulsification.

In order to profit from the maximum extractability of the solvent combined with maximum throughput it is especially desirable to minimize the emulsion and entrainment difficulties in the liquid-liquid extraction of olefinic hydrocarbons having at least four carbon atoms in the chain using a solvent consisting of an ammoniacal solution of copper ions with an anion capable of forming cuprous salts soluble in such ammoniacal solution. Suitable anions include sulfate, phosphate, acetate, lactate, tartrate, formate, nitrate, carbonate, chloride, fluoride, glycolate, salicylate, benzene sulfonate, orthophosphate, cyanide, thiocyanate, maleate, and so forth. An example of such system is the liquid-liquid extraction of butadiene-1,3 from a mixture of other olefinic and saturated hydrocarbons, mainly those containing four carbon atoms using an aqueous solution of copper ammonium acetate. A butadiene-1,3 recovery procedure which is widely used commercially employs the countercurrent extraction technique wherein a mixture of hydrocarbons containing both mono- and diolefins, mainly of four carbon atoms, is contacted in a series of mixer-settlers with an aqueous solution of copper ammonium acetate solution. The hydrocarbon and aqueous copper solvent are first thoroughly mixed for fine dispersion and intimate contact, following which the mix is transferred into a settler where gravity separation of the two components occurs. Separations of this type are of necessity somewhat time-consuming and the main purpose of this invention is to alleviate this problem.

It is therefore a principal object of the invention to provide means and techniques for speeding the separation of certain valuable unsaturated hydrocarbons from other contaminating materials with which such olefins are in admixture, while simultaneously providing means and techniques for effecting a more complete separation of the hydrocarbon and aqueous phases.

Numerous other objects and features of advantages will be immediately apparent from a consideration of the drawing wherein there is illustrated an embodiment of an apparatus especially adapted to carry out the process of the invention.

In accordance with the invention, an aqueous ammoniacal solution of a soluble cuprous salt is used as an extractant in the liquid-liquid extraction of a low molecular weight unsaturated hydrocarbon which is soluble in the extractant solution from an admixture with similarly boiling relatively difficultly separable olefins and paraffins, whereby an extract emulsion of two liquid phases are formed. The extract emulsion is then passed through a novel coalescing medium therefor comprising fibrous high molecular weight polyolefin, preferably polyethylene, provided as a baffle suspended within a settler tank, conventionally used for such separations, and so arranged to constitute a permeable barrier to the normal passage of the emulsion through the tank.

The use of a mat or pad of polyethylene material of a form to provide a high ratio of surface area to mass as a permeable barrier to the flow of the extract emulsion has been found to be markedly advantageous to other materials suggested for this or similar purposes. Stage efficiency has been increased in the order of 54 to 77% as compared to about 4% for a York steel mesh and about 6% for coke. Although the reason for this advantage is not known, it is believed that the characteristic of polyethylene to be completely wetted by hydrocarbon while repelling the copper extraction solution (approximately 50% water) may provide the great advantage of this material over others for this specific purpose. At the same time, the character of the polyethylene is such that it is not unduly dissolved or swelled in the hydrocarbon phase; it is substantially insoluble in the low molecular weight hydrocarbons at the temperature of the extraction.

Referring now in detail to the sole figure of the drawing, there is shown settling tank 13 equipped with inlet 14 at the proximal end and top of tank 13 for admitting hydrocarbon-solvent mixture thereto. Outlet 15 is provided at the distal end and top of tank 13 for the exit of the separated hydrocarbon and outlet 16 at the distal end and bottom of the tank for the exit of separated hydrocarbon-rich solvent. A series of baffle plates 18 are disposed horizontally within the tank, parallel to the direction of flow of the hydrocarbon-solvent mixture and emulsion. These baffle plates 18 divide the major central portion of the tank into a series of compartments which act as separation trays. Disposed vertically in tank 13, completely from top to bottom thereof and substantially normal to the flow of the hydrocarbon-solvent mixture and emulsion is the penetrable barrier and coalescing medium 21 which is fabricated, for purposes of example, from the polyethylene fiber in accordance with directions set forth in detail hereinafter. Cooperating with hydrocarbon outlet 15 is weir 25 and similarly cooperating with solvent outlet 16 is weir 26.

In operation, the mixture of hydrocarbons, mainly those having four carbon atoms and containing the desired butadiene-1,3 is thoroughly mixed with the extraction solvent, e.g., aqueous copper ammonium acetate, then pumped into the settling tank 13 illustrated by the drawing, the flow being as indicated along the baffle plates. As the mixture commences to separate, it passes through the penetrable barrier of polyethylene fibers which serve as an improved coalescer medium. The polyethylene fiber barrier supplies a very large liquid impingement area uniformly distributed throughout its mass. Entrained droplets in the liquid mixture contact the surfaces of the polyethylene fibers and are retained thereon long enough to allow them to merge with other similar droplets. In this way the rate of coalescence of the two phases is accelerated, undesirable entrainment of hydrocarbon in the extractant is reduced or substantially eliminated, and higher unit throughput rates are obtained.

Although the positioning of the polyethylene fiber penetrable barrier in the settling tank is not of primary importance, it is not of maximum utility unless it completely covers a vertical cross-sectional area of the tank substantially at right angles to the direction of flow of the emulsion. Its location along the horizontal dimension of the tank is of no appreciable concern and it is preferable to so position the penetrable barrier that its coalescing action occurs just after the admission of the mixture into the settling tank. It is contemplated that variations in the positioning of the barrier may be employed to suit the processing conditions, and of course, when it is separated into segments by horizontal baffles which compartmentalize the settler, the separate mats may be positioned at different distances from the entrance of the fluid mixture.

EXAMPLE I

A liquid $C_4$ hydrocarbon stream containing 0.2 mol percent of propylene, 3.8 mol percent of normal butylenes, 0.8 mol percent of ethyl acetylene, and 95.2 mol percent of butadiene cooled to 30° C. was passed to a 3700 gallon mixing tank at a rate of 65 g.p.m. and vigorously mixed therein with an excess of an ammoniated aqueous solution of cuprous acetate of the following composition: cuprous copper, 3.0 mols/liter; cupric copper, 0.3 mol/liter; ammonium ion, 11.0 mols/liter; acetate ion, 4.0 mols/liter. A side stream of the mixture was passed into a vessel 4 inches in diameter and 18 inches long filled with a polyethylene barrier. The mixture was next passed into a cylindrical settling tank approximately 30 inches long by 12 inches diameter for separation. The temperature of the settling tank was maintained in a range of from 30° to 40° F. and the pressure was substantially atmospheric. The residence time of the mixture in the settling tank was about 15 minutes, and the hydrocarbon and solvent phases were removed therefrom through top and bottom tank outlets respectively. The polyethylene barrier comprised polyethylene fibers having an approximate average individual diameter of 0.016 inch. The packing density of the polyethylene fiber barrier was 11.6 lb./ft.$^3$ with a void volume of approximately 0.80 ft.$^3$/ft.$^3$ and an area of approximately 637 ft.$^2$/ft.$^3$. The thickness of the polyethylene barrier within the tank averaged 18 inches. The efficiency of separating the cuprous ammonium acetate solvent containing butadiene-1,3 from the other hydrocarbons is 75%.

While the foregoing example is offered as an illustration of one preferred embodiment of the invention, it will be readily appreciated that certain modifications of the process may be made while retaining the true spirit and scope of the invention as delineated in the claims. For example, the size of the particular apparatus used in the process may vary to suit the processing conditions and the depth of the polyethylene fiber barrier may vary over relatively wide limits, for example in a settling tank 36 ft. by 12 ft. in diameter, the thickness of the barrier may be from 1 ft. to 30 ft., with a range of from 1 ft. to 2 ft. being preferred.

The polyolefin material is that conventionally known in the art and is preferably present in the form of fibers as defined hereinafter. Fibers of polypropylene and of copolyethylene-propylene, as well as polyethylene, are also insoluble in the low molecular weight hydrocarbons at temperatures not above their normal boiling points and are useful in this process. Those polyolefins which tend to dissolve or swell in the hydrocarbon phase under the separation conditions are unsuitable. The molecular weights of the polyolefins may vary over relatively wide ranges; suitable representative polyolefins are those with molecular weights within the approximate range of from 50,000 to 1,000,000, with the range of from 100,000 to 300,000 predominating.

The use of solutions of cuprous ammonium salts for the purpose of separating conjugated diolefins from other corresponding hydrocarbons is well known in the art and no claim is made herein for such process step per se.

Other materials such as, for example, metallurgical coke, raschig rings, Saran screening, Tygon rings, No. 421 York mesh steel, were considered for the penetrable barrier coalescing medium but the results obtained therefrom were unsatisfactory. Comparative results are given in Table 1 for the recovery of butadiene from a $C_4$ stream.

Table 1

STAGE EFFICIENCY IMPROVEMENT

| Material | Mixer, r.p.m. | Residence Time in Mixer, minutes | Murphree Efficiency,[1] percent | | |
|---|---|---|---|---|---|
| | | | Test | Blank | Improvement |
| Polyethylene | 37 | 3.06 | 92.2 | 52.0 | 77.3 |
| Do | 35 | 3.27 | 75.1 | 46.0 | 63.3 |
| Do | 50 | 4.20 | 108.0 | 70.3 | 53.6 |
| Fiberglas (bulk) | 35 | 3.70 | 80.7 | 54.3 | 48.6 |
| Metallurgical Coke | 35 | 2.34 | 58.1 | 55.0 | 5.6 |
| Raschig Rings | 35 | 2.34 | 59.6 | 54.0 | 10.4 |
| Tygon Rings | 35 | 3.60 | 52.2 | 52.0 | 0.4 |
| Saran Screening | 35 | 4.00 | 62.9 | 55.0 | 14.3 |
| No. 421 York Mesh Steel | 50 | 3.70 | 81.9 | 79.0 | 3.7 |

[1] Murphree Efficiency is described in Chemical Engineers Handbook by Perry, and reference is further found in Absorption and Extraction by Sherwood, 1937, McGraw-Hill Company.

From an examination of Table 1, the marked superiority of polyethylene as a coalescing medium for the present purpose is clearly demonstrated. Accordingly, the present invention is directed to the use in such a system and process of such a material as polyethylene fibers as a coalescing material to improve the efficiency of separation of the hydrocarbon and aqueous phases. By "fiber" is meant a material whose length is at least 100 times its diameter, thereby providing a slender filament-like configuration. The term as used herein refers to shape rather than to any other property.

The packing density of the fibrous polyolefins of the penetrable barrier may vary but the preferred packing density is from 10 lbs./ft.$^3$ to 14.8 lbs./ft.$^3$ with a void volume from 0.74 lb./ft.$^3$ to 0.80 lb./ft.$^3$. These packing densities give polyolefin surface areas from approximately 575 ft.$^2$/ft.$^3$ to 851 ft.$^2$/ft.$^3$ which have been found to give very satisfactory results in this process.

I claim as my invention:

1. In the separation of the phases of an emulsion emanating from a liquid-liquid extraction of $C_4$ diolefins and acetylenes from other more saturated $C_4$ hydrocarbons in a $C_4$ hydrocarbon fraction with an aqueous ammoniacal cuprous acetate extractant, the improvement of partially coalescing the separate phases of the extractant phase and liquid $C_4$ hydrocarbon phase of said emulsion which consists of passing all of said emulsion through a fixed penetrable barrier of fibrous polyethylene, said fixed barrier having a packing density from 10 lbs./ft.$^3$ to 14.8 lbs./ft.$^3$, to increase the separation rate of said respective liquid phases when they subsequently stratify in a separation zone.

2. Process in accordance with claim 1 wherein the penetrable barrier is disposed in a settler tank substantially normal to the direction of flow of said emulsion through said tank.

3. Process in accordance with claim 1 wherein the fibrous polyethylene penetrable barrier has a packing density of from 11.6 lbs./ft.$^3$ to 14.8 lbs./ft.$^3$ with a void volume of from 0.74 ft.$^3$/ft.$^3$ to 0.80 ft.$^3$/ft.$^3$ and an area of from 637 ft.$^2$/ft.$^3$ to 851 ft.$^2$/ft.$^3$.

4. Process in accordance with claim 1 wherein the packing density of the polyethylene fiber is approximately 10.0 lbs./ft.$^3$ with a void volume of approximately 0.8 ft.$^3$/ft.$^3$ and an area of approximately 575 ft.$^2$/ft.$^3$.

References Cited in the file of this patent

UNITED STATES PATENTS

| | | |
|---|---|---|
| 2,399,882 | Morrell et al. | May 7, 1946 |
| 2,472,487 | Lovell | June 7, 1949 |
| 2,503,014 | Webber | Apr. 4, 1950 |
| 2,542,147 | Krewer et al. | Feb. 20, 1951 |
| 2,907,717 | Hann | Oct. 6, 1959 |
| 3,062,907 | Macht et al. | Nov. 6, 1962 |